United States Patent
Shen

(10) Patent No.: US 10,983,872 B2
(45) Date of Patent: Apr. 20, 2021

(54) SYSTEMS AND METHODS FOR DATA SYNCHRONIZATION

(71) Applicant: BEIJING DIDI INFINITY TECHNOLOGY AND DEVELOPMENT CO., LTD., Beijing (CN)

(72) Inventor: Guoquan Shen, Hangzhou (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 17/067,754

(22) Filed: Oct. 11, 2020

(65) Prior Publication Data

US 2021/0064478 A1  Mar. 4, 2021

Related U.S. Application Data

(63) Continuation of application No. PCT/CN2019/082191, filed on Apr. 11, 2019.

(30) Foreign Application Priority Data

Apr. 11, 2018 (CN) .......................... 201810322776.3

(51) Int. Cl.
  *G06F 16/00* (2019.01)
  *G06F 11/14* (2006.01)
  *G06F 16/182* (2019.01)

(52) U.S. Cl.
  CPC ........ *G06F 11/1458* (2013.01); *G06F 16/182* (2019.01)

(58) Field of Classification Search
  CPC ............... G06F 11/1458; G06F 16/182; G06F 11/1448; G06F 11/1471; G06F 11/2094; G06F 11/2097; G06F 17/30194
  (Continued)

(56) References Cited

U.S. PATENT DOCUMENTS 10,311,019 B1 * 6/2019 Vijendra ............... G06F 16/188
2012/0278429 A1 * 11/2012 Miura .................. G06F 11/2041
  709/217

(Continued)

FOREIGN PATENT DOCUMENTS

CN 104202375 A 12/2014
CN 104283906 A 1/2015

(Continued)

OTHER PUBLICATIONS

Feng Wang et al., "Hadooop High Availability through Metadata Replication", CloudDB'09, ACM, Nov. 2, 2009, 8 pages.*

(Continued)

*Primary Examiner* — Monica M Pyo
(74) *Attorney, Agent, or Firm* — Metis IP LLC

(57) ABSTRACT

Systems and methods for data synchronization are provided. The system may include a first Hadoop service cluster, a second Hadoop service cluster and a third service cluster. The first Hadoop service cluster may store the file metadata from a client. The second Hadoop service cluster connects to the first Hadoop service cluster. The third service cluster may back up updated data block of the first Hadoop service cluster to the second Hadoop service cluster.

20 Claims, 9 Drawing Sheets

(58) Field of Classification Search
USPC .......................................................... 707/620
See application file for complete search history.

(56) References Cited

U.S. PATENT DOCUMENTS

2013/0166568 A1* 6/2013 Binkert .................. G06F 16/86
707/741
2014/0279834 A1* 9/2014 Tsirogiannis ........... G06F 16/86
707/602

FOREIGN PATENT DOCUMENTS

| CN | 105187464 A | 12/2015 |
| CN | 106484565 A | 3/2017 |
| CN | 107465767 A | 12/2017 |

OTHER PUBLICATIONS

International Search Report in PCT/CN2019/082191 dated Jul. 10, 2019, 5 pages.
Written Opinion in PCT/CN2019/082191 dated Jul. 10, 2019, 4 pages.

* cited by examiner

100

102
Receiving, at the third service cluster, a synchronization request from a second Hadoop service cluster periodically 104
Parsing, at the third service cluster, a standby edit log regarding the second Hadoop service cluster based on the synchronization request 106
Obtaining, at the third service cluster, a master edit log regarding the first Hadoop service cluster in response to the synchronization request 108
Determining, at the third service cluster, an offset between the standby edit log and the master edit log 110
Obtaining, at the third service cluster, based on the determined offset, a updated data block regarding the first Hadoop service cluster and a mapping table regarding the updated data block 112
Backing up, at the third service cluster, data of the updated data block to the second Hadoop service cluster based on the mapping table

SYSTEMS AND METHODS FOR DATA SYNCHRONIZATION

CROSS-REFERENCE TO RELATED APPLICATIONS

This application is a continuation of International Application No. PCT/CN2019/082191, filed on Apr. 11, 2019, which claims priority of Chinese Patent Application No. 201810322776.3, filed on Apr. 11, 2018, the entire contents of each of which are hereby incorporated by reference.

TECHNICAL FIELD

The present disclosure generally relates to a data backup technology, and in particular, relates to systems and methods for a data synchronization between multiple service clusters.

BACKGROUND

The Hadoop distributed file system (HDFS) has been applied to various fields, such as, big data analysis. The HDFS may be used to store massive amounts of data. In some cases, if the Hadoop cluster is suddenly down, the data services of the HDFS may shut down, resulting in inaccessibility of the data stored in the HDFS to clients. Therefore, it is desirable to develop systems and methods for data synchronization in order to provide the data services reliably.

SUMMARY

According to an aspect of the present disclosure, a method is provided. The method may include one or more of the following operations. The method may be implemented on a third service cluster, the third service cluster being operably connected to a first Hadoop service cluster and a second Hadoop service cluster. At least one processor may receive, at the third service cluster, a synchronization request from the second Hadoop service cluster periodically. The at least one processor may parse, at the third service cluster, a standby edit log regarding the second Hadoop service cluster based on the synchronization request. The at least one processor may obtain, at the third service cluster, a master edit log regarding the first Hadoop service cluster in response to the synchronization request. The at least one processor may determine, at the third service cluster, an offset between the standby edit log and the master edit log. The at least one processor may obtain, at the third service cluster, based on the determined offset, a updated data block regarding the first Hadoop service cluster and a mapping table regarding the updated data block. The at least one processor may back up, at the third service cluster, data of the updated data block to the second Hadoop service cluster based on the mapping table.

In some embodiments, the at least one processor may determine, at the third service cluster, whether the offset is greater than or equal to an offset threshold. In response to a determination that the offset is less than the offset threshold, the at least one processor may back up, at the third service cluster, the master edit log to the second Hadoop service cluster. In response to a determination that the offset is greater than or equal to the offset threshold, the at least one processor may back up, at the third service cluster, the master edit log, a master fsimage file, and the mapping table to the second Hadoop service cluster. A data block corresponding to the master edit log may be designated as the updated data block. In response to the synchronization request from the second Hadoop service cluster, the at least one processor may fetch and back up, at the third service cluster, the updated data block to the second Hadoop service cluster based on the mapping table.

In some embodiments, the synchronization request may include a start memory address and a data length regarding the updated data block.

According to an aspect of the present disclosure, a method is provided. The method may include one or more of the following operations. The method may be implemented on a first Hadoop service cluster, the first service cluster being operably connected to a second Hadoop service cluster and a third Hadoop service cluster. At least one processor may receive, at the first Hadoop service cluster, file metadata from a client. The file metadata may be divided into a filename and a data block. The at least one processor may store, at the first Hadoop service cluster, the filename and the data block in a Namenode and a Datanode respectively. The at least one processor may generate, at the first Hadoop service cluster, a mapping table based on a relation between the filename and the data block. The Namenode may be configured to generate a master edit log regarding the stored file metadata, and generate a master fsimage file corresponding to the master edit log. The Datanode may be configured to report a updated data block to the Namenode according to a Heartbeat mechanism.

In some embodiments, the at least one processor may receive, at the first Hadoop service cluster, an operation request regarding a specified data block from the client. The at least one processor may generate, at the first Hadoop service cluster, a corresponding operating instruction in response to the operation request. The operating instruction may be configured to direct the first Hadoop service cluster to write an offset to the master edit log. The at least one processor may send, at the first Hadoop service cluster, the operating instruction to the Datanode corresponding to the specified data block.

In some embodiments, the at least one processor may periodically send, at the first Hadoop service cluster, the master edit log, the master fsimage file, and the mapping table to the second Hadoop service cluster according to the Heartbeat mechanism.

According to an aspect of the present disclosure, a method is provided. The method may include one or more of the following operations. The method may be implemented on a second Hadoop service cluster, the second service cluster being operably connected to a first Hadoop service cluster and a third Hadoop service cluster. At least one processor may receive, at the second Hadoop service cluster, a master edit log, a master fsimage file, a mapping table from the first Hadoop service cluster periodically. The at least one processor may generate, at the second Hadoop service cluster, a reference value regarding an offset between the master edit log and a standby edit log of the second Hadoop service cluster. The at least one processor may generate, at the second Hadoop service cluster, based on the reference value, a synchronization request, and send the synchronization request to the first Hadoop service cluster or the third Hadoop service cluster.

According to an aspect of the present disclosure, a system is provided. The system may include at least one storage device, at least one processor in communication with the at least one storage device. The at least one storage device may include one or more sets of instructions. When executing the one or more sets of instructions, the at least one processor may receive, at the third service cluster, a synchronization request from the second Hadoop service cluster periodically. The at least one processor may parse, at the third service cluster, a standby edit log regarding the second Hadoop service cluster based on the synchronization request. The at least one processor may obtain, at the third service cluster, a master edit log regarding the first Hadoop service cluster in response to the synchronization request. The at least one processor may determine, at the third service cluster, an offset between the standby edit log and the master edit log. The at least one processor may obtain, at the third service cluster, based on the determined offset, a updated data block regarding the first Hadoop service cluster and a mapping table regarding the updated data block. The at least one processor may back up, at the third service cluster, data of the updated data block to the second Hadoop service cluster based on the mapping table.

According to an aspect of the present disclosure, a system is provided. The system may include at least one storage device, at least one processor in communication with the at least one storage device. The at least one storage device may include one or more sets of instructions. When executing the one or more sets of instructions, the at least one processor may receive, at the first Hadoop service cluster, file metadata from a client. The file metadata may be divided into a filename and a data block. The at least one processor may store, at the first Hadoop service cluster, the filename and the data block in a Namenode and a Datenode respectively. The at least one processor may generate, at the first Hadoop service cluster, a mapping table based on a relation between the filename and the data block. The Namenode may be configured to generate a master edit log regarding the stored file metadata, and generate a master fsimage file corresponding to the master edit log. The Datanode may be configured to report a updated data block to the Namenode according to a Heartbeat mechanism.

According to an aspect of the present disclosure, a system is provided. The system may include at least one storage device, at least one processor in communication with the at least one storage device. The at least one storage device may include one or more sets of instructions. When executing the one or more sets of instructions, the at least one processor may receive, at the second Hadoop service cluster, a master edit log, a master fsimage file, a mapping table from the first Hadoop service cluster periodically. The at least one processor may generate, at the second Hadoop service cluster, a reference value regarding an offset between the master edit log and a standby edit log of the second Hadoop service cluster. The at least one processor may generate, at the second Hadoop service cluster, based on the reference value, a synchronization request, and send the synchronization request to the first Hadoop service cluster or the third Hadoop service cluster.

According to another aspect of the present disclosure, a non-transitory computer readable medium is provided. The non-transitory computer readable medium may comprise executable instructions that cause at least one processor to effectuate a method. The method may include one or more of the following operations. The method may be implemented on a third service cluster, the third service cluster being operably connected to a first Hadoop service cluster and a second Hadoop service cluster. At least one processor may receive, at the third service cluster, a synchronization request from the second Hadoop service cluster periodically. The at least one processor may parse, at the third service cluster, a standby edit log regarding the second Hadoop service cluster based on the synchronization request. The at least one processor may obtain, at the third service cluster, a master edit log regarding the first Hadoop service cluster in response to the synchronization request. The at least one processor may determine, at the third service cluster, an offset between the standby edit log and the master edit log. The at least one processor may obtain, at the third service cluster, based on the determined offset, a updated data block regarding the first Hadoop service cluster and a mapping table regarding the updated data block. The at least one processor may back up, at the third service cluster, data of the updated data block to the second Hadoop service cluster based on the mapping table.

According to another aspect of the present disclosure, a non-transitory computer readable medium is provided. The non-transitory computer readable medium may comprise executable instructions that cause at least one processor to effectuate a method. The method may include one or more of the following operations. The method may be implemented on a first Hadoop service cluster, the first service cluster being operably connected to a second Hadoop service cluster and a third Hadoop service cluster. At least one processor may receive, at the first Hadoop service cluster, file metadata from a client. The file metadata may be divided into a filename and a data block. The at least one processor may store, at the first Hadoop service cluster, the filename and the data block in a Namenode and a Datenode respectively. The at least one processor may generate, at the first Hadoop service cluster, a mapping table based on a relation between the filename and the data block. The Namenode may be configured to generate a master edit log regarding the stored file metadata, and generate a master fsimage file corresponding to the master edit log. The Datanode may be configured to report a updated data block to the Namenode according to a Heartbeat mechanism.

According to another aspect of the present disclosure, a non-transitory computer readable medium is provided. The non-transitory computer readable medium may comprise executable instructions that cause at least one processor to effectuate a method. The method may include one or more of the following operations. The method may be implemented on a second Hadoop service cluster, the second service cluster being operably connected to a first Hadoop service cluster and a third Hadoop service cluster. At least one processor may receive, at the second Hadoop service cluster, a master edit log, a master fsimage file, a mapping table from the first Hadoop service cluster periodically. The at least one processor may generate, at the second Hadoop service cluster, a reference value regarding an offset between the master edit log and a standby edit log of the second Hadoop service cluster. The at least one processor may generate, at the second Hadoop service cluster, based on the reference value, a synchronization request, and send the synchronization request to the first Hadoop service cluster or the third Hadoop service cluster.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 1 is a flowchart illustrating an exemplary process for data synchronization according to some embodiments of the present disclosure;

DETAILED DESCRIPTION

Figure 2:
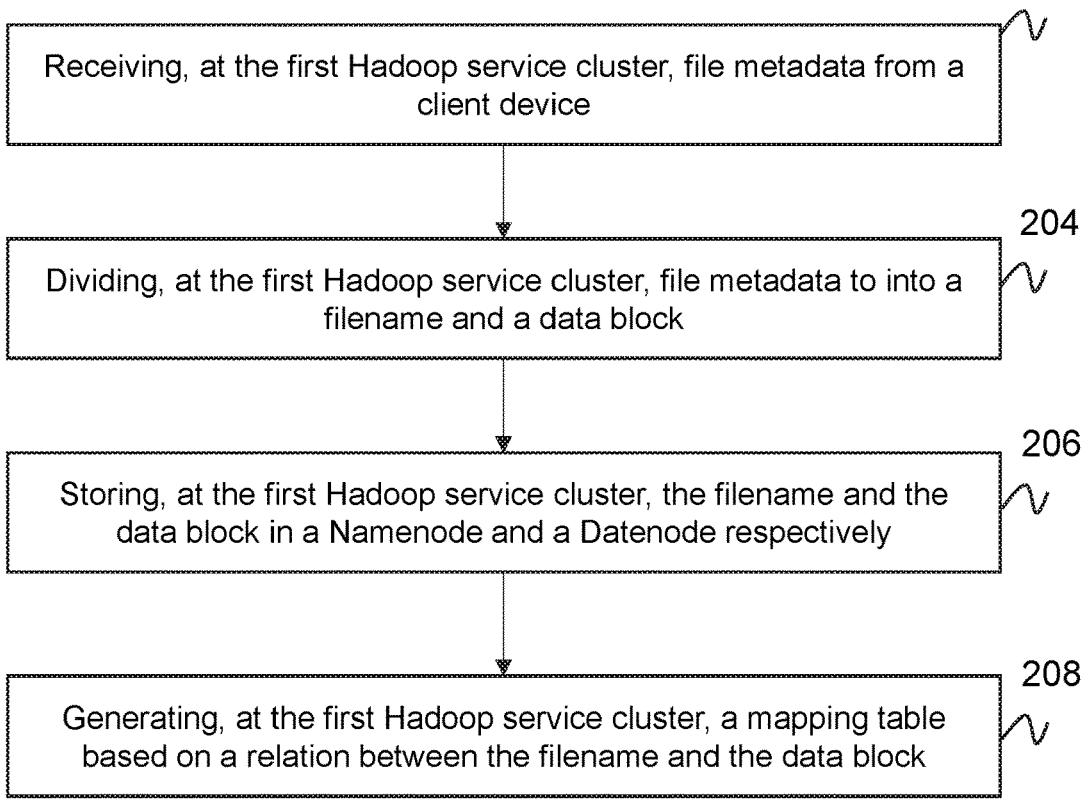
FIG. 2 is a flowchart illustrating an exemplary process for data synchronization according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

It will be understood that the term "system," "module," and/or "block" used herein are one method to distinguish different components, elements, parts, section or assembly of different level in ascending order. However, the terms may be displaced by another expression if they achieve the same purpose.

The term "module," or "block," as used herein, refers to logic embodied in hardware or firmware, or to a collection of software instructions. A module or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an Electrically Programmable Read-Only-Memory (EPROM). It will be further appreciated that hardware modules/units/blocks may be included in connected logic components, such as gates and flip-flops, and/or can be included in programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may apply to a system, an engine, or a portion thereof.

It will be understood that when a module or block is referred to as being "connected to," or "coupled to," another module, or block, it may be directly connected or coupled to, or communicate with the other module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

In some cases, the data in a master Hadoop service cluster is usually copied and exported to a standby Hadoop service cluster periodically by using a specific data export tool. However, the standby Hadoop service cluster may lose some new updated data in the master Hadoop service cluster due to the update is not timely. Before the data synchronization based on the above way, it mat takes a long time to compare with the difference of the data between the master Hadoop service cluster and the standby Hadoop service cluster, which may cause a relatively low efficiency of the data synchronization. To resolve the above issues or similar issues, various embodiments of the present disclosure may be provided as a data synchronization system configured to back up or synchronize the data stored in a Hadoop service cluster. For example, the system may determine an offset regarding a master edit log of the master Hadoop service cluster and a standby edit log of the standby Hadoop service cluster. The system may determine updated data blocks of the master Hadoop service cluster based on the offset. The system may back up the updated data blocks from the master Hadoop service cluster to the standby Hadoop service cluster effectively and accurately.

FIG. 1 is a flowchart illustrating an exemplary process for data synchronization according to some embodiments of the present disclosure. In some embodiments, the process 100 for data synchronization may be implemented by data synchronization device or data synchronization system. For example, the process 100 may be implemented in the data synchronization system 700 illustrated in FIG. 7. The process 100 may also be implemented as one or more instructions stored in a storage medium and called and/or executed by at least one processing device of the data synchronization device. The operations of the illustrated process presented below are intended to be illustrative. In some embodiments, the process 100 may be accomplished with one or more additional operations not described, and/or without one or more of the operations discussed. Additionally, the order in which the operations of the process 100 as illustrated in FIG. 1 and described below is not intended to be limiting.

Figure 7:
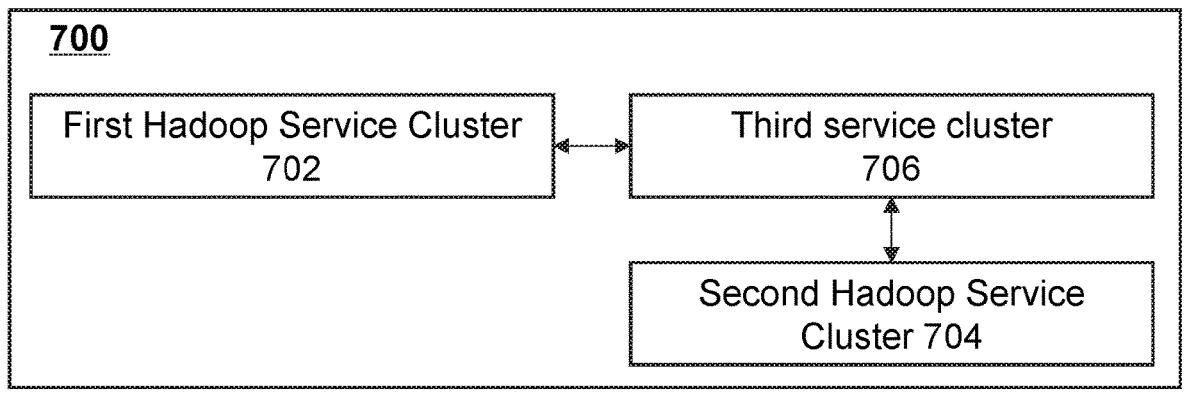
FIG. 7 is a block diagram illustrating an exemplary data synchronization system according to some embodiments of the present disclosure.

As illustrated in FIG. 1, the process 100 for data synchronization may be applied to an interaction among a first Hadoop service cluster, a second Hadoop service cluster, and a third service cluster. As described in connection with FIG. 7, FIG. 7 shows an exemplary data synchronization system according to some embodiments of the present disclosure. As shown in FIG. 7, data synchronization system 700 may include a first Hadoop service cluster 702, a second Hadoop service cluster 704, and a third service cluster 706. As used herein, the first Hadoop service cluster 702 may be referred to as a master service cluster, which is configured to receive file metadata sent by a client, and store the file metadata by a distributed storage system of the first Hadoop service cluster. The second Hadoop service cluster 704 may be referred to as a standby service cluster, which is configured to connect to the first Hadoop service cluster 702 through a registered backup interface, and backup the data sent by the first Hadoop service cluster. The third service cluster 706 may provide the backup interface which connects to the first Hadoop service cluster 702 and the second Hadoop service cluster 704. The third service cluster 706 may be configured to operate the data synchronization (e.g., synchronizing or backing up updated data blocks in the first Hadoop service cluster 702 to the second Hadoop service cluster 704) between the first Hadoop service cluster 702 and the second Hadoop service cluster 704. In some embodiments, the third service cluster may be integrated to the first Hadoop service cluster 702 and/or the second Hadoop service cluster 704.

In 102, the processor (e.g., a processing device at the third service cluster 706) may receive a synchronization request from a second Hadoop service periodically. The synchronization request may be used to request for the data synchronization between a first Hadoop service cluster and the second Hadoop service cluster.

In 104, the processor (e.g., the processing device at the third service cluster 706) may parse a standby edit log regarding the second Hadoop service cluster based on the synchronization request. In some embodiments, the synchronization request may include the edit log regarding the second Hadoop service cluster (also referred herein to as the standby edit log). The standby edit log may be represented as an "EditLog" file of the second Hadoop service cluster.

In 106, the processor (e.g., the processing device at the third service cluster 706) may obtain a master edit log regarding the first Hadoop service cluster in response to the synchronization request. For example, the processor may obtain the master edit log from the first Hadoop service cluster 702 upon receipt of the synchronization request. As used herein, the edit log regarding the first Hadoop service cluster may be referred herein to as the master edit log. The master edit log may be represented as an "EditLog" file of the first Hadoop service cluster.

In 108, the processor (e.g., the processing device at the third service cluster 706) may determine an offset between the standby edit log and the master edit log. Specifically, the processor may determine a difference value between a serial number of the master edit log and a serial number of the standby edit log. The difference value may be designated as the offset.

The Hadoop distributed file system (HDFS) may include at least one Namenode storing metadata and a plurality of Datanodes storing data blocks. The NameNode and the DataNode may be in constant communication. The NameNode is responsible for storing or managing the HDFS namespace, controlling the access of external client devices. For example, the Namenode may manage one or more operations regarding the HDFS, such as creation, deletion, movement, or rename of the namespace, etc.

The Namenode may store two different constructs of the file system metadata: the fsimage and the edit log. The fsimage is a file that stores all the information regarding the file system namespace. The fsimage file represents a point-in-time snapshot of the file system's metadata. The edit log may include a series of files, called edit log segments, that together represent all the namespace updates/modifications made since the creation of the fsimage.

In some embodiments, the fsimage file may be designated as a serial number, and the edit log may also be designated as a serial number. The serial number of the fsimage may correspond to the serial number of the edit log one by one. In some embodiments, the fsimage may be deemed as a mirror file of the edit log, which includes all edits or transactions in the edit log. For example, assuming that the serial number of the edit log is 10, the serial number of the corresponding fsimage file may be 10 too. In some embodiments, the serial number of the edit log may be out sync with the serial number of the fsimage, the processor may determine the difference value of their serial numbers, that is, the offset. The offset may be further used to the data synchronization between the first Hadoop service cluster and the second Hadoop service cluster.

In 110, the processor (e.g., the processing device at the third service cluster 706) may obtain, based on the determined offset, a updated data block regarding the first Hadoop service cluster and a mapping table regarding the updated data block.

In 112, the processor (e.g., the processing device at the third service cluster 706) may further back up data of the updated data block to the second Hadoop service cluster based on the mapping table.

In some embodiments, the second Hadoop service cluster may send the synchronization request to the first Hadoop service cluster and/or the third service cluster. Upon receipt of the synchronization request, the third service cluster may obtain the master edit log and the standby edit log from the first Hadoop service cluster and the second Hadoop service cluster respectively. The third service cluster may determine the offset between the master edit log and the standby edit log. In some embodiments, the offset may refer to a difference value of the serial number of the master edit log and the standby edit log. In some embodiments, if the offset is relatively small, the third service cluster may obtain one or more missing master edit logs. The one or more missing master edit logs may be sent to the Namenode of the second Hadoop service cluster. However, if the offset is relatively big, which may mean it has been a long time since the second Hadoop service cluster (i.e., the standby service cluster) is out of sync with the first Hadoop service cluster (i.e., the master service cluster). To solve this issue, the third service cluster may obtain the current fsimage files and the edit logs, and send them to the Namenode of the second Hadoop service cluster for further data synchronization operation. It may improve the reliability of data synchronization backup to some extent. In some embodiments, when the offset of the master edit log and the standby edit log is relatively small, it may be not necessary to perform data synchronization backup between the Datanodes of the first Hadoop service cluster and the second Hadoop service cluster, which may improve spectrum utilization and data throughput of the data synchronization system.

In some embodiments, the determining for the offset, the updated data block regarding the first Hadoop service cluster, and the corresponding map table may improve the efficient of determining the data block difference between the first Hadoop service cluster and the second Hadoop service cluster. It may help to quickly find out the data blocks that need to be backed up by the second Hadoop service cluster, which reduces the time for calculating data differences and improves the efficiency and reliability of data backup.

In some embodiments, during the period that the first Hadoop service cluster stores new file system metadata, the Namenode may add the new metadata to the fsimage file, and add corresponding edits or transactions to the edit log. The edit log segment may be rolled accordingly. Before beginning the data synchronization, the serial numbers of the edit logs of the first Hadoop service cluster and the second Hadoop service cluster may be compared, and the offset of the edit logs be determined. The new written data in the fsimage of the first Hadoop service cluster may be obtained based on the offset and the mapping table. Then the new written data may be backed up to the second Hadoop service cluster, which may achieve a fast data synchronization between the first Hadoop service cluster and the second Hadoop service cluster.

In some embodiments, in order to ensure that the master service cluster (e.g., the first Hadoop service cluster) may work normally for the client, asynchronous communication may also be applied to the data backup, which further improves data throughput of the data synchronization system.

In some embodiments, the processor may obtain, based on the determined offset, an updated data block regarding the first Hadoop service cluster and a mapping table regarding the updated data block, and back up data of the updated data block to the second Hadoop service cluster based on the mapping table. Specifically, the processor may determine whether the offset is greater than or equal to an offset threshold. If the offset is less than the offset threshold, the processor may back up the master edit log to the second Hadoop service cluster. If the offset is greater than or equal to the offset threshold, the processor may back up the master edit log, a master fsimage file, and the mapping table to the second Hadoop service cluster. The master fsimage file may refer to the fsimage file of the first Hadoop service cluster. In some embodiments, if the master edit log is updated, a data block corresponding to the master edit log is designated as the updated data block. In response to the synchronization request from the second Hadoop service cluster, the processor may fetch the updated data block based on the mapping table, and back up the updated data block to the second Hadoop service cluster.

If the offset is greater than or equal to the offset threshold, which determines that the second Hadoop service cluster may not keep data synchronization with the first Hadoop service cluster to some extent. It may cause that the second Hadoop service cluster does not provide data services reliably.

When the offset is less than the offset threshold, it may be comprehended that the difference value of the serial number of the master edit log and the standby edit log is relatively small. In the case, the master edit log stored in the first Hadoop service cluster may be backed up to the second Hadoop service cluster, which may improve the efficiency of the data synchronization and reduce the delay in the data synchronization.

When the offset is greater than or equal to the offset threshold, it may be comprehended that the difference between the serial numbers of the master edit log and the standby edit log is relatively big. It may have been a long time since the second Hadoop service cluster is out of sync with the first Hadoop service cluster. To solve this issue, the third service cluster may obtain the current fsimage files, the edit logs and the corresponding map table, and backup them to the second Hadoop service cluster. It may reduce the possibility of abnormal data synchronization due to the large amount of data to be synchronize, and improve the reliability of data synchronization to some extent.

FIG. 2 is a flowchart illustrating an exemplary process for data synchronization according to some embodiments of the present disclosure. In some embodiments, the process 200 for data synchronization may be implemented by data synchronization device or data synchronization system. For example, the process 200 may be implemented in the data synchronization system 700 illustrated in FIG. 7. The process 200 may also be implemented as one or more instructions stored in a storage medium and called and/or executed by at least one processing device of the data synchronization device. The operations of the illustrated process presented below are intended to be illustrative. In some embodiments, the process 100 may be accomplished with one or more additional operations not described, and/or without one or more of the operations discussed. Additionally, the order in which the operations of the process 200 as illustrated in FIG. 2 and described below is not intended to be limiting.

In 202, the processor (e.g., the processing device at the first Hadoop service cluster 702) may receive file metadata from a client. For example, a HDFS client may write a file to the first Hadoop service cluster 702. The processor may obtain the file metadata in response to the write operation. The metadata may include a global unique identifier (GLOBAL_ID) of the file path, an identifier of user (USER_ID) that created the file path, file permissions, directory tree, update time, access time, size, and so on.

In 204, the processor (e.g., the processing device at the first Hadoop service cluster 702) may divide the file metadata into a filename and a data block. In some embodiments, in the HDFS, the file metadata may be divided into the filename and the data block. In some embodiments, the filename may be included in a namespace. The data block may include actual data recorded in the file. In some embodiments, the data size of each data block may be 64 megabytes (i.e., 64 M). The filename and the data block may be stored respectively.

In 206, the processor (e.g., the processing device at the first Hadoop service cluster 702) may store the filename and the data block in a Namenode and a Datenode respectively. In some embodiments, the Namenode's primary responsibility is storing the HDFS namespace. Within the HDFS, a given Namenode may manage namespace operations like opening, closing, and renaming files and directories. A Namenode may also map the data block to the Datanode, which handle read and write requests from the clients. The Datanode may store the data block.

In some embodiments, the Namenode of the first Hadoop service cluster may generate a master edit log regarding the stored file metadata, and generate a master fsimage file corresponding to the master edit log. The Datanote of the first Hadoop service cluster may report the data block to the Namenode according to a Heartbeat mechanism. In some embodiments, if the data block is updated, the Datanote may report the updated data block to the Namenode according to the Heartbeat mechanism.

In 208, the processor (e.g., the processing device at the first Hadoop service cluster 702) may generate a mapping table based on a relation between the filename and the data block. In some embodiments, the mapping table may include a corresponding relation between the filename and the data block. The processor may find the data block corresponding to the filename based on the mapping table. For example, in the mapping table, a data block ID may be one to one correspondence to the filename. In some embodiments, the mapping table may include a corresponding relation between the data block and the Datanote. The processor may find the Datanote storing the data block based on the mapping table. For example, in the mapping table, a data block ID may correspond to the Datanote. The generation of the mapping table may improve the speed and the accuracy of searching for the updated data block in the first Hadoop service cluster during the data synchronization, and reduce the time for calculating data differences.

The HDFS may include at least one Namenode storing the metadata and a plurality of Datanodes storing data blocks. The NameNode and the DataNode may be in constant communication. The NameNode is responsible for storing the HDFS namespace. The Datanote is responsible for storing the data blocks. The Namenode may store the fsimage and the edit log. The fsimage may include all the information regarding the file system namespace. The edit log may include all the edits or transactions regarding the file system namespace. In some embodiments, the fsimage file may be designated as a serial number, and the edit log may also be designated as a serial number. The serial number of the fsimage may correspond to the serial number of the edit log one by one. In some embodiments, the fsimage may be deemed as a mirror file of the edit log, which includes all edits or transactions in the edit log.

In some embodiments, the Datanodes may communicate with the Namenode according to the heartbeat mechanism. For example, the Datanodes may report the stored data block to the Namenode according to the heartbeat mechanism. As another example, the Namenode may send an execution command to the Datanodes according to the heartbeat mechanism, so that the Datanode corresponding to the specific data block may be retrieved when the second Hadoop service cluster requesting a specific data block for the first Hadoop service cluster.

In some embodiments, the processor may receive an operation request regarding a specified data block from the client. The processor may generate a corresponding operating instruction in response to the operation request. The operating instruction may be configured to direct the first Hadoop service cluster to write an offset to the master edit log. The processor may further send the operating instruction to the Datanode corresponding to the specified data block.

When the client sends an operation request regarding the specified data block through an API interface connected the client to the first Hadoop service cluster, the Namenode may add all the operations to the edit log, and trigger an edit log roll. In some embodiments, the rolling may cause the changing of the offset. In some embodiments, the operating instruction corresponding to the operation request may be sent to the specified data block for further processing.

For example, the operation request is associated with a write operation. The edit log may store the paths of the operations for the HDFS. The corresponding write operation may be stored in the edit log.

In some embodiments, the fsimage file and the edit log file may be serialized. When the Namenode is started, the contents of the fsimage file may be loaded into the memory. Then the Namenode may execute the operation in the edit log, so as to update the file system metadata and actual data in the memory simultaneously. The metadata in the memory may support the read operation of the client. The isolation between the client and the Datanodes may be realized due to the metadata.

If there are updates in HDFS, the updates may be rewritten into the edit log. In some embodiments, if all updates are added to the fsimage file, the fsimage file may have very large data size (GigaByte (GB) level, or even more). The system may run very slowly accordingly. However, if the updates are written into the edit log, it may be different. The edit log may need to be updated synchronously before the client successfully sends a code and after performing the write operation. In some embodiments, if a file to be stored is very large, the write operations may be performed through multiple machines (servers or clusters), the write operations will return success when all the write operations are completed. It may avoid the metadata is out of sync due to the machine failures.

In some embodiments, the first Hadoop service cluster may periodically send the master edit log, the master fsimage, and the mapping table to the second Hadoop service cluster according to the heartbeat mechanism.

The second Hadoop service cluster may determine whether the data is synchronously updated based on the master edit log, the master fsimage and the mapping table, which are periodically sent to the second Hadoop service cluster according to the heartbeat mechanism. It may improve the accuracy and real-time of the stored data in the second Hadoop service cluster, and reduce the delay of the data synchronization, and improve the efficiency and data throughput of data synchronization.

In some embodiments, the first Hadoop service cluster may receive the synchronization request from the second Hadoop service cluster. The synchronization request may include a start memory address and a data length regarding the updated data block. In the synchronization request, the start memory address and the data length regarding the updated data block may be set, which may improve the accuracy of the data synchronization, reduce the time for querying the updated data and improve the efficiency of data update.

Figure 3:
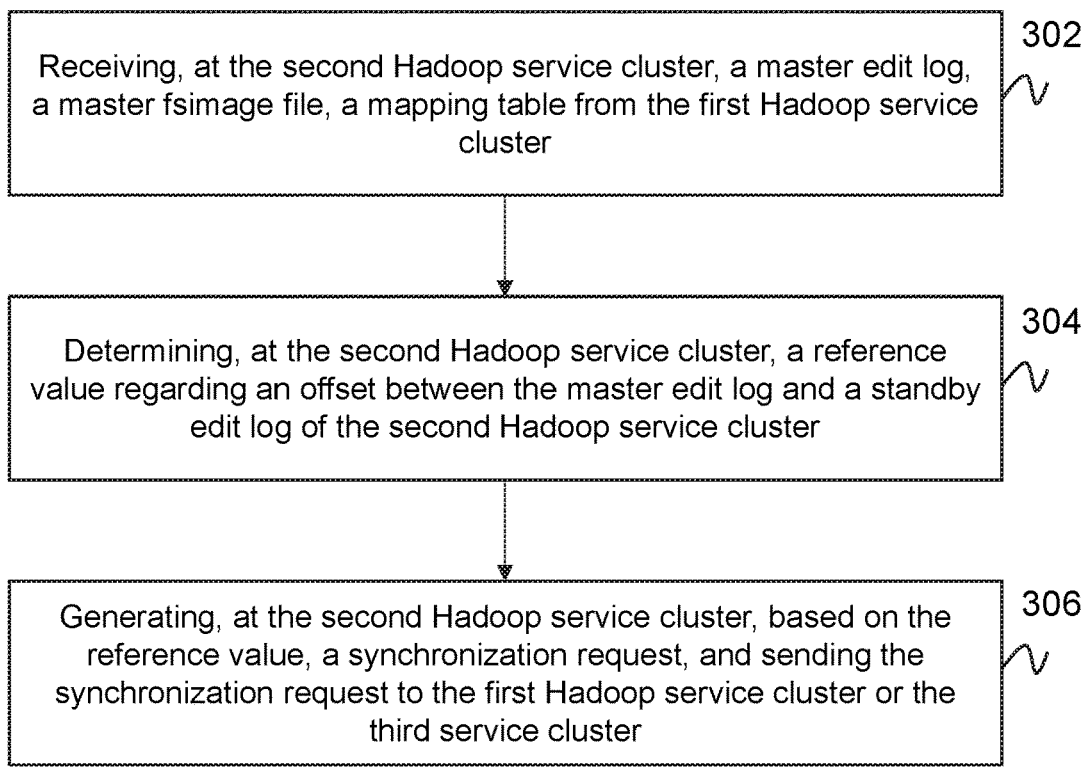
FIG. 3 is a flowchart illustrating an exemplary process for data synchronization according to some embodiments of the present disclosure.

FIG. 3 is a flowchart illustrating an exemplary process for data synchronization according to some embodiments of the present disclosure. In some embodiments, the process 300 for data synchronization may be implemented by data synchronization device or data synchronization system. For example, the process 300 may be implemented in the data synchronization system 700 illustrated in FIG. 7. The process 300 may also be implemented as one or more instructions stored in a storage medium and called and/or executed by at least one processing device of the data synchronization device. The operations of the illustrated process presented below are intended to be illustrative. In some embodiments, the process 300 may be accomplished with one or more additional operations not described, and/or without one or more of the operations discussed. Additionally, the order in which the operations of the process 300 as illustrated in FIG. 3 and described below is not intended to be limiting.

In 302, the processor (e.g., the processing device at the second Hadoop service cluster 704) may receive a master edit log, a master fsimage file, and a mapping table from the first Hadoop service cluster periodically. For example, the first Hadoop service cluster 702 may send the master edit log, the master fsimage file, and the mapping table to the second Hadoop service cluster 704 according to the heartbeat mechanism.

In 304, the processor (e.g., the processing device at the second Hadoop service cluster 704) may determine a reference value regarding an offset between the master edit log and a standby edit log of the second Hadoop service cluster. For example, the second Hadoop service cluster 704 may determine the offset between the received master edit log and the local standby edit log. When the offset is greater than or equal to a threshold, the processor may determine the reference value existing as the form of a binary value, e.g., 1. Otherwise, the reference value may be determined as 0.

In 305, the processor (e.g., the processing device at the second Hadoop service cluster 704) may generate, based on the reference value, a synchronization request, and send the synchronization request to the first Hadoop service cluster or the third Hadoop service cluster. For example, if the reference value is 1, the processor may send the synchronization request to the first Hadoop service cluster or the third service cluster. The third service cluster 706 may parse the standby edit log from the synchronization request. The third service cluster 706 may obtain the master edit log from the first Hadoop service cluster in response to the synchronization request. The third service cluster 706 may determine the offset between the standby edit log and the master edit log. If the offset is less than the offset threshold, the master edit log may be backed up to the second Hadoop service cluster. If the offset is greater than or equal to the offset threshold, the master edit log, the master fsimage file, and the mapping table may be backed up to the second Hadoop service cluster 704. The third service cluster 706 may fetch and back up the updated data block to the second Hadoop service cluster 704 based on the mapping table.

Figure 4:
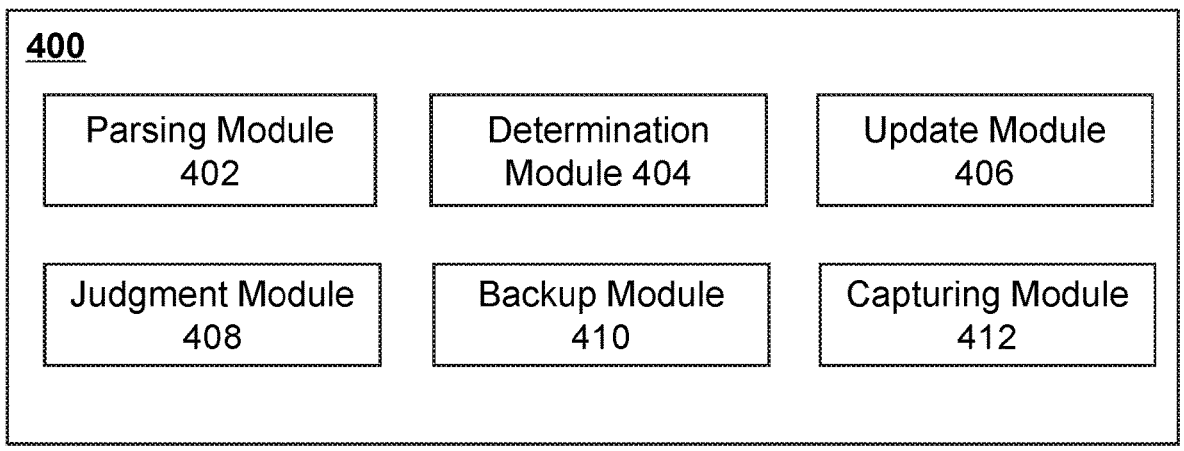
FIG. 4 is a block diagram illustrating an exemplary data synchronization device according to some embodiments of the present disclosure.

FIG. 4 is a block diagram illustrating an exemplary data synchronization device according to some embodiments of the present disclosure. The data synchronization device 400 may be operably to couple with the third service cluster (e.g., the third service cluster 706 as illustrated in FIG. 7).

The data synchronization device 400 may include at least one processing device for processing one or more operations regarding the data synchronization (e.g., the process 100 illustrated in FIG. 1). As shown in FIG. 4, the data synchronization device 400 may include a parsing module 402, a determination module 404, a update module 406, a judgment module 408, a backup module 410, and a capturing module 410.

The modules may be hardware circuits of at least part of the processing device. The modules may also be implemented as an application or set of instructions read and executed by the processing device. Further, the modules may be any combination of the hardware circuits and the application/instructions. For example, the modules may be the part of the processing device when the processing device is executing the application/set of instructions.

The parsing module 402 may receive a synchronization request from a second Hadoop service periodically. The synchronization request may be used to request for the data synchronization between a first Hadoop service cluster (e.g., the first Hadoop service cluster 702) and the second Hadoop service cluster (e.g., the second Hadoop service cluster 704). The parsing module 402 may be further parse a standby edit log regarding the second Hadoop service cluster based on the synchronization request. The standby edit log may be represented as an "EditLog" file of the second Hadoop service cluster.

The determination module 404 may obtain a master edit log regarding the first Hadoop service cluster in response to the synchronization request. For example, the determination module 404 may obtain the master edit log from the first Hadoop service cluster 702 upon receipt of the synchronization request. As used herein, the edit log regarding the first Hadoop service cluster may be referred herein to as the master edit log. The master edit log may be represented as an "EditLog" file of the first Hadoop service cluster. The determination module 404 may determine an offset between the standby edit log and the master edit log. Specifically, the determination module 404 may determine a difference value between a serial number of the master edit log and a serial number of the standby edit log. The difference value may be designated as the offset.

For the Hadoop distributed file system (HDFS), the HDFS may include at least one Namenode storing file system metadata and a plurality of Datanodes storing data blocks. The Namenode and the Datanode may be in constant communication. The Namenode is responsible for storing or managing the HDFS namespace, controlling the access of an external client. For example, the Namenode may manage one or more operations regarding the HDFS, such as creation, deletion, movement, or rename of the namespace, etc.

The Namenode may store two different constructs of the file system metadata: the fsimage and the edit log. The fsimage is a file that stores all the information regarding the file system namespace. The fsimage file represents a point-in-time snapshot of the file system's metadata. The edit log may include a series of files, called edit log segments, that together represent all the namespace updates/modifications made since the creation of the fsimage. In some embodiments, the fsimage file may be designated as a serial number, and the edit log may also be designated as a serial number. The serial number of the fsimage may correspond to the serial number of the edit log one by one. In some embodiments, the fsimage may be deemed as a mirror file of the edit log, which includes all edits or transactions in the edit log. For example, assuming that the serial number of the edit log is 10, the serial number of the corresponding fsimage file may be 10 too. In some embodiments, the serial number of the edit log may be out sync with the serial number of the fsimage, the determination module 404 may determine the difference value of their serial numbers, that is, the offset. The offset may be further used to the data synchronization between the first Hadoop service cluster and the second Hadoop service cluster.

The update module 406 may obtain, based on the determined offset, a updated data block regarding the first Hadoop service cluster and a mapping table regarding the updated data block. The update module 406 may further back up data of the updated data block to the second Hadoop service cluster based on the mapping table.

For example, the second Hadoop service cluster 704 may send the synchronization request to the first Hadoop service cluster 702 and/or the third service cluster 706. Upon receipt of the synchronization request, the parsing module 402 of the third service cluster 706 may obtain the master edit log and the standby edit log from the first Hadoop service cluster 702 and the second Hadoop service cluster 704 respectively. The determination module 404 of the third service cluster 706 may determine the offset between the master edit log and the standby edit log. In some embodiments, the offset may refer to a difference value of the serial numbers of the master edit log and the standby edit log. In some embodiments, if the offset is relatively small, the third service cluster 706 may obtain one or more missing master edit logs. The one or more missing master edit logs may be sent to the Namenode of the second Hadoop service cluster 704. However, if the offset is relatively big, which means it has been a long time since the second Hadoop service cluster 704 (i.e., the standby service cluster) is out of sync with the first Hadoop service cluster 702 (i.e., the master service cluster). To solve this issue, the third service cluster 706 may obtain the current fsimage files and the edit logs, and send them to the Namenode of the second Hadoop service cluster 704 for further data synchronization operation. It may improve the reliability of data synchronization backup to some extent. In some embodiments, when the offset of the master edit log and the standby edit log is relatively small, it may be not necessary to perform data synchronization backup between the Datanodes of the first Hadoop service cluster 702 and the second Hadoop service cluster 704, which may improve spectrum utilization and data throughput of the data synchronization system.

In some embodiments, the determining for the offset, the updated data block regarding the first Hadoop service cluster, and the corresponding map table may improve the efficient of determining the data block difference between the first Hadoop service cluster and the second Hadoop service cluster. It may help to quickly find out the data blocks that need to be backed up by the second Hadoop service cluster, which reduces the time for calculating data differences and improves the efficiency and reliability of data backup.

In some embodiments, during the period that the first Hadoop service cluster stores new file system metadata, the Namenode may add the new metadata to the fsimage file, and add corresponding transactions to the edit log. The edit log segment may be rolled accordingly. Before beginning the data synchronization, the serial numbers of the edit logs of the first Hadoop service cluster and the second Hadoop service cluster may be compared, and the offset of the edit logs may be determined. The new written data in the fsimage of the first Hadoop service cluster may be obtained based on the offset and the mapping table. Then the new written data may be backed up to the second Hadoop service cluster, which may achieve a fast data synchronization between the first Hadoop service cluster and the second Hadoop service cluster.

In some embodiments, in order to ensure that the master service cluster (e.g., the first Hadoop service cluster) may work normally for the client, asynchronous communication may also be applied to the data backup, which further improves data throughput of the data synchronization system.

Specifically, the judgment module 408 may determine whether the offset is greater than or equal to a preset offset threshold. If the offset is less than the offset threshold, the backup module 410 may synchronously back up the master edit log to the second Hadoop service cluster. If the offset is greater than or equal to the offset threshold, the backup module 410 may synchronously back up the master edit log, a master fsimage file, and the mapping table to the second Hadoop service cluster. The master fsimage file may refer to the fsimage file of the first Hadoop service cluster. In some embodiments, if the master edit log is updated, a data block corresponding to the master edit log is designated as the updated data block. In response to the synchronization request from the second Hadoop service cluster, the capturing module 412 may fetch the updated data block based on the mapping table, and back up the updated data block to the second Hadoop service cluster.

When the offset is less than the offset threshold, it may be comprehended that the difference value of the serial number of the master edit log and the standby edit log is relatively small. In the case, the master edit log stored in the first Hadoop service cluster may be backed up to the second Hadoop service cluster, which may improve the efficiency of the data synchronization and reduce the delay in the data synchronization.

When the offset is greater than or equal to the offset threshold, it may be comprehended that the difference value of the serial number of the master edit log and the standby edit log is relatively big. It may have been a long time since the second Hadoop service cluster is out of sync with the first Hadoop service cluster. To solve this issue, the third service cluster may obtain the current fsimage files, the edit logs and the corresponding map table, and back up them to the second Hadoop service cluster. It may improve the reliability of data synchronization to some extent.

It should be noted that the above description of the data synchronization device 400 is merely provided for the purposes of illustration, and not intended to limit the scope of the present disclosure. For persons having ordinary skills in the art, multiple variations and modifications may be made under the teachings of the present disclosure. For example, the data synchronization device 400 may further include a storage module to facilitate data storage. However, those variations and modifications do not depart from the scope of the present disclosure.

Figure 5:
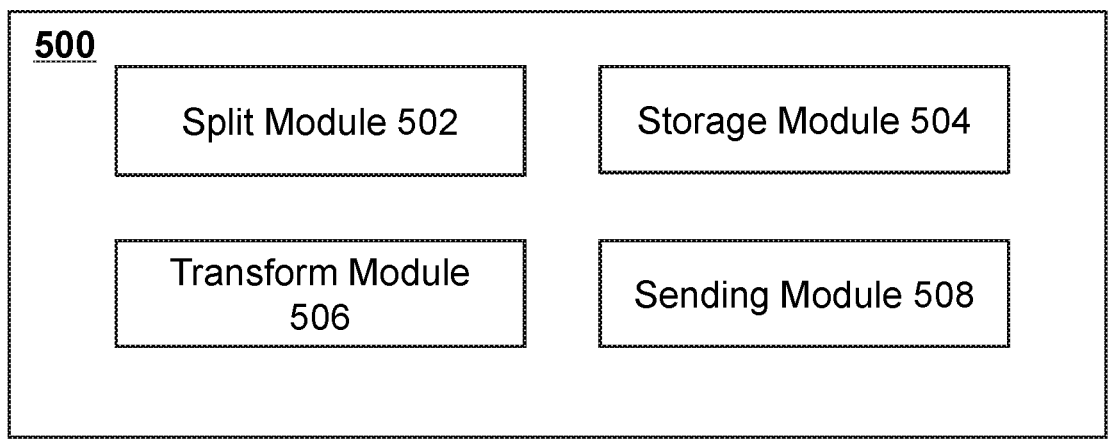
FIG. 5 is a block diagram illustrating an exemplary data synchronization device according to some embodiments of the present disclosure.

FIG. 5 is a block diagram illustrating an exemplary data synchronization device according to some embodiments of the present disclosure. The data synchronization device 500 may be operably to couple with the first Hadoop service cluster (e.g., the first Hadoop service cluster 702 as illustrated in FIG. 7). The data synchronization device 500 may include at least one processing device for processing one or more operations regarding the data synchronization (e.g., the process 200 illustrated in FIG. 2). As shown in FIG. 5, the data synchronization device 500 may include a split module 502, a storage module 504, a transform module 506, and a sending module 508.

The modules may be hardware circuits of at least part of the processing device. The modules may also be implemented as an application or set of instructions read and executed by the processing device. Further, the modules may be any combination of the hardware circuits and the application/instructions. For example, the modules may be the part of the processing device when the processing device is executing the application/set of instructions.

The split module 502 may receive file metadata from a client. For example, a HDFS client may write a file to the first Hadoop service cluster 702. The split module 502 of first Hadoop service cluster 702 may obtain the file metadata in response to the write operation. The metadata may include a global unique identifier (GLOBAL_ID) of the file path, an identifier of user (USER_ID) that created the file path, file permissions, directory tree, update time, access time, size, and so on. The split module 502 may divide the file metadata into a filename and a data block. In some embodiments, in the HDFS, the file metadata may be divided into the filename and the data block. In some embodiments, the filename may be included in a namespace. The data block may include actual data recorded in the file. In some embodiments, the data size of each data block may be 64 megabytes (i.e., 64 M). The filename and the data block may be stored respectively.

The storage module 504 may store the filename and the data block in a Namenode and a Datenode respectively. In some embodiments, the storage module 504 may store corresponding relation between the filename and the data block in the Namenode, and generate a mapping table that includes the corresponding relation. For example, in the mapping table, a data block ID may be one to one correspondence to the filename. The data block corresponding to the filename may be retrieved based on the mapping table.

In some embodiments, the Namenode of the first Hadoop service cluster may generate a master edit log regarding the stored file metadata, and generate a master fsimage file corresponding to the master edit log. The Datanote of the first Hadoop service cluster may report the data block to the Namenode according to a Heartbeat mechanism. In some embodiments, if the data block is updated, the Datanote may report the updated data block to the Namenode according to the Heartbeat mechanism.

The HDFS may include at least one Namenode storing the metadata and a plurality of Datanodes storing data blocks. The NameNode and the DataNode may be in constant communication. The NameNode is responsible for storing the HDFS namespace. The Datanote is responsible for storing the data blocks. The Namenode may store the fsimage and the edit log. The fsimage may include all the information regarding the file system namespace. The edit log may include all the edits or transactions regarding the file system namespace. In some embodiments, the fsimage file may be designated as a serial number, and the edit log may also be designated as a serial number. The serial number of the fsimage may correspond to the serial number of the edit log one by one. In the mapping table, the one to one correspondence relation may be stored in the mapping table. In some embodiments, the fsimage may be deemed as a mirror file of the edit log, which includes all edits or transactions in the edit log.

In some embodiments, the transform module 506 of the first Hadoop service cluster may generate an operating instruction in response to an operation request regarding a specified data block from the client. The operating instruction may be configured to direct the first Hadoop service cluster to write an offset to the master edit log. The sending module 508 of the first Hadoop service cluster may send the operation instruction to the Datanode corresponding to the specified data block.

Specifically, when the client sends an operation request regarding the specified data block through an API interface connected the client to the first Hadoop service cluster, the Namenode may add all the operations to the edit log, and trigger an edit log roll. In some embodiments, the rolling may cause the changing of the offset. In some embodiments, the operating instruction corresponding to the operation request may be sent to the specified data block for further processing.

For example, the operation request is associated with a write operation. The edit log may store the paths of the operations for the HDFS. The corresponding write operation may be stored in the edit log.

In some embodiments, the fsimage file and the edit log file may be serialized. When the Namenode is started, the contents of the fsimage file may be loaded into the memory. Then the Namenode may execute the operation in the edit log, so as to update the file system metadata and actual data in the memory simultaneously. The metadata in the memory may support the read operation of the client. The isolation between the client and the Datanodes may be realized due to the metadata.

If there are updates in HDFS, the updates may be rewritten into the edit log. In some embodiments, if all updates are added to the fsimage file, the fsimage file may have very large data size (GigaByte (GB) level, or even more). The system may run very slowly accordingly. However, if the updates are written into the edit log, it may be different. The edit log may need to be updated synchronously before the client successfully sends a code and after performing the write operation. In some embodiments, if a file to be stored is very large, the write operations may be performed through multiple machines (servers or clusters), the write operations will return success when all the write operations are completed. It may avoid the metadata is out of sync due to the machine failures.

In some embodiments, the sending module 508 may periodically send the master edit log, the master fsimage, and the mapping table to the second Hadoop service cluster according to the heartbeat mechanism.

In some embodiments, the second Hadoop service cluster may determine whether the data is synchronously updated based on the master edit log, the master fsimage and the mapping table, which are periodically sent to the second Hadoop service cluster according to the heartbeat mechanism. It may improve the accuracy and real-time of the stored data in the second Hadoop service cluster, and reduce the delay of the data synchronization, and improve the efficiency and data throughput of data synchronization.

In some embodiments, the data synchronization device 500 of the first Hadoop service cluster may receive the synchronization request from the second Hadoop service cluster. The synchronization request may include a start memory address and a data length regarding the updated data block. In the synchronization request, the start memory address and the data length regarding the updated data block may be set, which may improve the accuracy of the data synchronization, reduce the time for querying the updated data and improve the efficiency of data update.

It should be noted that the above description of the data synchronization device 500 is merely provided for the purposes of illustration, and not intended to limit the scope of the present disclosure. For persons having ordinary skills in the art, multiple variations and modifications may be made under the teachings of the present disclosure. For example, the data synchronization device 500 may further include a storage module to facilitate data storage. However, those variations and modifications do not depart from the scope of the present disclosure.

Figure 6:
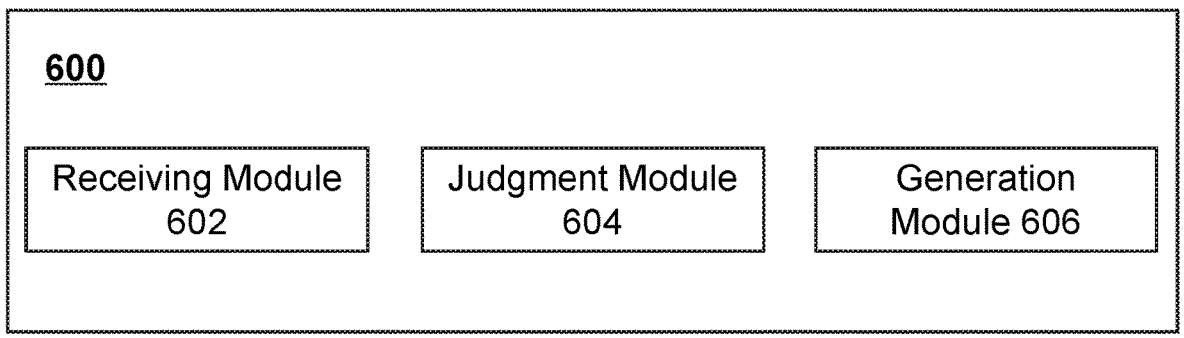
FIG. 6 is a block diagram illustrating an exemplary data synchronization device according to some embodiments of the present disclosure.

FIG. 6 is a block diagram illustrating an exemplary data synchronization device according to some embodiments of the present disclosure. The data synchronization device 600 may be operably to couple with the second Hadoop service cluster (e.g., the second Hadoop service cluster 704 as illustrated in FIG. 7). The data synchronization device 600 may include at least one processing device for processing one or more operations regarding the data synchronization (e.g., the process 300 illustrated in FIG. 3). As shown in FIG. 6, the data synchronization device 600 may include a receiving module 602, a judgment module 604 and a generation module 508.

The modules may be hardware circuits of at least part of the processing device. The modules may also be implemented as an application or set of instructions read and executed by the processing device. Further, the modules may be any combination of the hardware circuits and the application/instructions. For example, the modules may be the part of the processing device when the processing device is executing the application/set of instructions.

The receiving module 602 may receive a master edit log, a master fsimage file, and a mapping table from the first Hadoop service cluster periodically. The received master edit log, the master fsimage file, and the mapping table may be used to the data synchronization. For example, the data synchronization device 600 of the second Hadoop service cluster 704 may back up the received data.

In some embodiments, the judgment module 604 may determine a reference value regarding an offset between the master edit log and a standby edit log of the second Hadoop service cluster. For example, the synchronization device 600 may determine the offset between the received master edit log and the local standby edit log. When the offset is greater than or equal to a threshold, the judgment module 604 may determine the reference value existing as the form of a binary value, e.g., 1. Otherwise, the reference value may be determined as 0.

The generation module 606 may generate a synchronization request based on the reference value. The synchronization request may be sent to the first Hadoop service cluster or the third Hadoop service cluster. For example, if the reference value is 1, the generation module 606 may send the synchronization request to the first Hadoop service cluster 702 or the third service cluster 706. The third service cluster 706 may parse the standby edit log from the synchronization request. The third service cluster 706 may obtain the master edit log from the first Hadoop service cluster in response to the synchronization request. The third service cluster 706 may determine the offset between the standby edit log and the master edit log. If the offset is less than the offset threshold, the master edit log may be backed up to the second Hadoop service cluster. If the offset is greater than or equal to the offset threshold, the master edit log, the master fsimage file, and the mapping table may be backed up to the second Hadoop service cluster 704. The third service cluster 706 may fetch and back up the updated data block to the second Hadoop service cluster based on the mapping table.

It should be noted that the above description of the data synchronization device 600 is merely provided for the purposes of illustration, and not intended to limit the scope of the present disclosure. For persons having ordinary skills in the art, multiple variations and modifications may be made under the teachings of the present disclosure. For example, the data synchronization device 600 may further include a determination module to determine the offset. However, those variations and modifications do not depart from the scope of the present disclosure.

Figure 8:
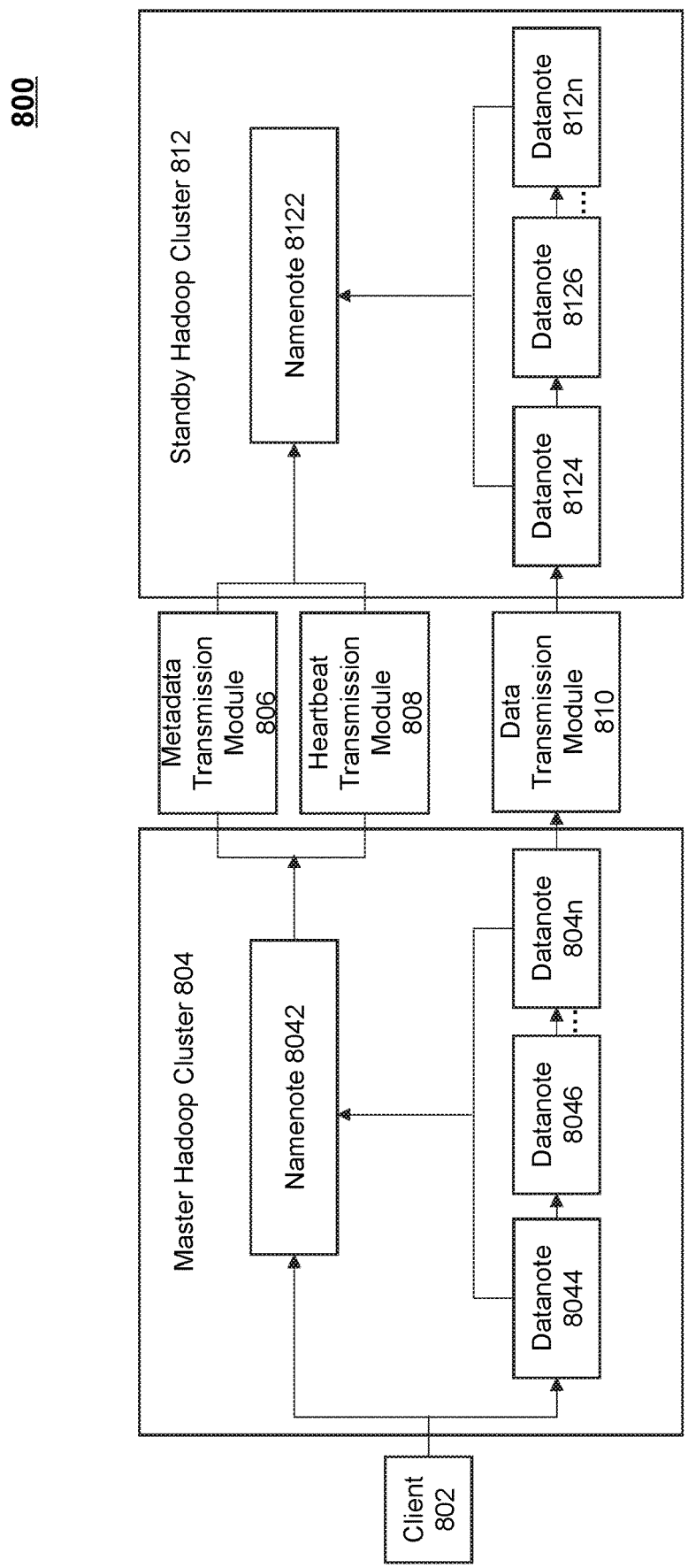
FIG. 8 is a schematic diagram illustrating an exemplary data synchronization system according to some embodiments of the present disclosure.

FIG. 8 is a schematic diagram illustrating an exemplary data synchronization system according to some embodiments of the present disclosure. In data synchronization system 800, a master Hadoop cluster 804 (e.g., the first Hadoop service cluster 702) may communicate with a client 802. The master Hadoop cluster 804 may be configured to receive data written by the client 802. The master Hadoop cluster 804 may include a Namenode 8042, and a plurality of Datanotes, such as a Datanode 8044, a Datanode 8046, . . . , a Datanode 804n (n is an even number that is greater than or equal to 6). When the client 802 writes metadata into the Namenode 8042, if a default replication factor in the master Hadoop cluster 804 is 3, the Datanode 8044, the Datanode 8046, and the Datanode 8048 (not shown in FIG. 8) may be selected for writing the metadata to be stored. As used herein, the Namenode of the master Hadoop cluster may also be referred to as the master Namenode, and the Datanote of the master Hadoop cluster may also be referred to as the master Datanote.

The Namenode 8042 may generate an edit log and a fsimage file based on the written metadata. The stored data blocks in the Datanodes may correspond to the metadata in the Namenode. In some embodiments, a mapping table that records the relation between the metadata and the data blocks may be generated in the Namenode 8042. The metadata transmission module 806, connected to the Namenode 8042 in the master Hadoop cluster 804, may be configured to transmit the edit log and the fsimage file in the Namenode 8042. The heartbeat transmission module 808, connected to the Namenode 8042 in the master Hadoop cluster 804, may be configured to transmit the mapping table in the Namenode 8042. The data transmission module 810 may be in communication with the Datanodes (e.g., the Datanode 8044, the Datanode 8044, . . . , the Datanode 804n). The data transmission module 810 may be configured to acquire the data block stored in the Datanodes. The standby Hadoop cluster 812 may connect to the metadata transmission module 806, the heartbeat transmission module 808, and the data transmission module 810. The standby Hadoop cluster 812 may be configured to back up the data written by the client 802. In the standby Hadoop cluster 812, there is at least one Namenode 8122 and a plurality of Datanodes, such as, a Datanode 8124, a Datanode 8126, . . . , and a Datanode 812n. The Namenode 8122, respectively connected to the output of the metadata transmission module 806 and the heartbeat transmission module 808, may be configured to receive the edit log and the fsimage file from the Namenode 8042, and compare them with the local edit log and the fsimage file stored in the Namenode 8122 to obtain an offset. In some embodiments, the Namenode 8122 may also be configured to receive the mapping table from the Namenode 8042, and obtain the data (data written by the client 802) that needs to be backed up based on the offset and the mapping table. The Datanode 8124, the Datanode 8126, . . . , and the Datanode 812n may store the data transmitted by the data transmission module 810. As used herein, the Namenode of the standby Hadoop cluster may also be referred to as the standby Namenode or the mirror Namenode, and the Datanote of the standby Hadoop cluster may also be referred to as the standby Datanote or the mirror Datenode.

In some embodiments, the data synchronization or data backup may be performed between the master Hadoop cluster (e.g., the first Hadoop service cluster 702) and the standby Hadoop cluster (that is, the second Hadoop service cluster 704).

For example, the client 802 may create a new file in the master Hadoop cluster 804 through an API interface of the master Hadoop cluster 804. The Namenode 8042 may load the file matadata to the fsimage file in the memory and add the corresponding edits or transactions in the edit log. The edit log may be rolled, and the offset value may be changed accordingly. The Namenode 8042 may obtain the data blocks regarding the file metadata, and designate three DataNodes (assuming that the replication factor is 3) among the DataNodes registered in the Namenode 8042 as the nodes that accept the data blocks. A result may be returned to the client 802. In some embodiments, the result may include addresses of the designated three Datanotes. The client may send at least portion of the data blocks to a first DataNode according to a first address corresponding to the first Datanote. When the first Datanote received the at least one portion of data blocks successfully, the client may further send the data blocks to two other DataNodes according to the addresses of the two other DataNodes. In some embodiments, when receiving the data block successfully, the Datanote may return a result indicating the successful receiving to the client. Then the client may send the remaining data blocks to these Datanotes. In some embodiments, the Datanodes may report the data block lists stored on them to the Nameode 8042 according to the heartbeat mechanism. The Namenode 8042 may generate a mapping table between the data blocks and the DataNodes.

In some embodiments, the Namenode 8042 of the master Hadoop cluster 804 (referred to herein as the master Namenode) may obtain the address of the Namenode 8122 of the standby Hadoop cluster 812 (referred to herein as the mirror Namenode). The master Namenode may send the master edit log to the mirror Namenode 8122 through the metadata transmission module 806 based on the address of the Namenode 8122. After receiving the master edit log, the mirror Namenode 8122 may compare the master edit log with the local edit log. If an offset between the master edit log and the local edit log is equal to or greater than a threshold, the data between the master Hadoop cluster 804 and the standby Hadoop cluster 812 may not be synchronous. The standby Hadoop cluster 812 may need to keep sync with the master Hadoop cluster 804. The mirror Namenode 8122 may send a data synchronization request to the master Namenode 804 through the heartbeat mechanism module 808. For example, the mirror Namenode 8122 may request for the mapping table.

The mirror Namenode 8122 receives the mapping table between the data blocks and the DataNodes of the master Hadoop cluster. if a new data block may be created, the mirror Namenode 8122 may send data synchronization command to one or more mirror Datanodes (e.g., the Datanodes 8124-8128), and send parameters of target Datanodes of the master Hadoop cluster to the one or more Datanodes. After receiving the data synchronization command, the mirror Datanodes may obtain the addresses of the target DataNodes from the parameters, and back up the data block according to the addresses.

Figure 9:
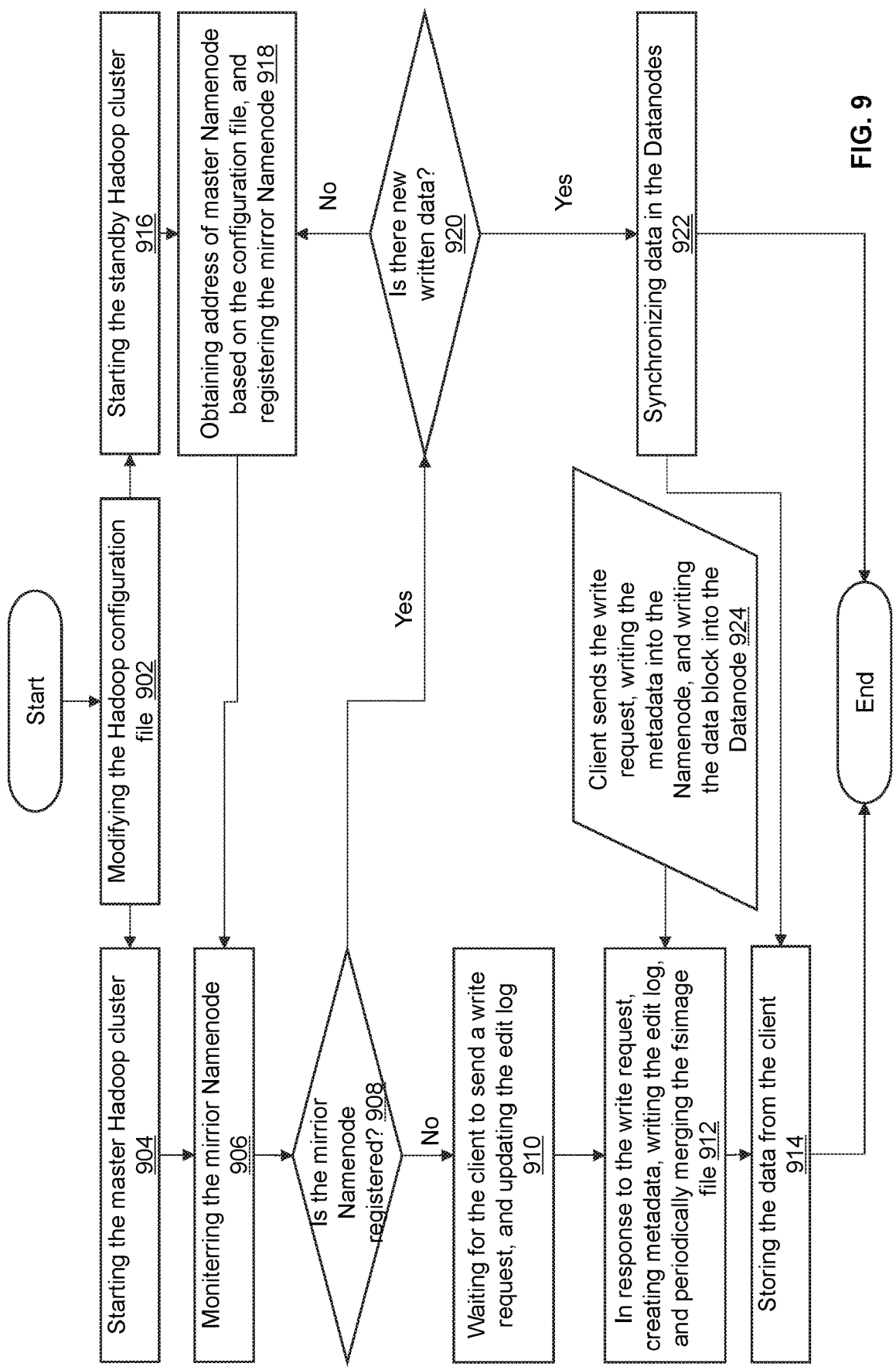
FIG. 9 is a flowchart illustrating an exemplary process for data synchronization according to some embodiments of the present disclosure.

FIG. 9 is a flowchart illustrating an exemplary process for data synchronization according to some embodiments of the present disclosure.

In 902, the configuration files, that is, the hdfs-site.xmls, in the Hadoop clusters (e.g., the master Hadoop cluster and the standby Hadoop cluster) may be modified, respectively. For example, the configuration item, DFS_PRIMARY, may be added. "DFS_PRIMARY" may be indicative of a flag of the master Hadoop cluster. As another example, the configuration item, DFS_PRIMARY_ADDRESS, may be added. DFS_PRIMARY_ADDRESS may be indicative of a server address of the master Namenode of the master Hadoop cluster. The mirror Namenode of the standby Hadoop cluster may be registered according to the address. Then the master Hadoop cluster and the standby Hadoop cluster may be started.

In 904, the master Hadoop cluster may be started.

In 916, the standby Hadoop cluster may be started.

In 918, the server address of the master NameNode of the master Hadoop cluster, based on the configure files, may be obtained. The mirror Namenode of the standby Hadoop cluster may be registered. For example, the address of the mirror Namenode is registered via the an RPC service interface.

In some embodiments, the scheduling interface for a remote process server, such as, MirrorProtocolService, may be created. The interface may be implemented by the NameNode. Both the master Namenode and the mirror Namenode may provide the remote services. In some embodiments, the Mirror Namenode may register in the master Namenode via the interface. In some embodiments, the standby Hadoop cluster may replicate the MetaData remotely via the interface.

In 906, the mirror Namenode of the standby Hadoop cluster may be monitored.

In 908, Whether the mirror Namenode of the standby cluster is registered may be determined. If the mirror Namenode is registered, operation 920 may proceed. Otherwise, operation 910 may proceed.

In some embodiments, upon receipt of the registration request of the mirror Namenode, the Master Namenode may save the address of the mirror Namenode in the memory, and wait for the write request sent by the client.

In 910, the master Namenode waits for the client to send a write request, and the edit log may be rolled. The offset regarding the edit log may be changed.

In some embodiments, when the client creates a new file and writes data into the master Hadoop cluster, the master Namenode may asynchronously send the master edit log to the mirror Namenode periodically by using the replication function. The mirror Namenode may compare the master edit log with the local edit log of the standby Hadoop cluster. If the master Hadoop cluster and the standby Hadoop cluster are not synchronous, the mirror Namenode may send a data synchronization request to the master Namenode through the heartbeat mechanism. For example, the mirror Namenode may request for the mapping table between the data blocks and the Datanodes.

In 912, the master Namenode receives the write request from the client. The master Namenode may create the metadata, and write the metadata in the edit log. In some embodiments, the master Namenode receives may periodically merge the edit log with the fsimage file. As described in connection with operation 924, the client sends a write request to master Hadoop cluster, the metadata may be written in the NameNode, and the data block may be written into the DataNode.

In 914, the DataNode of the master Hadoop cluster may store the actual data included in the file from the client.

In some embodiments, the mirror Namenode may send data synchronization command to one or more Datanodes of the standby Hadoop cluster. The data synchronization command may be used to remotely access that data block in the Datanodes of the master Hadoop cluster.

In 920, the mirror Namenode may determine whether there is new written data based on the offset. If there is the new written data, operation 922 may proceed. The edit log, the fsimage file, and the mapping table between the data blocks and the Datanodes may be sent to the standby Hadoop cluster according to the heartbeat mechanism.

In some embodiments, the scheduling interface for a remote process server, such as, MirrorDataProtocolService, may be created. This interface may be implemented by the DataNode. The interface aims at accessing data between the data blocks based on the Block ID, for example, transfer-Block.

In some embodiments, in response to the data synchronization command from the mirror Namenode, the mirror Namenode may remotely obtain the data block corresponding to the Block ID through the Mirror DataProtocolService service in order to synchronize the data in the master Hadoop cluster.

In 922, the data in the DataNodes of the master Hadoop cluster may be synchronized to the Datanodes of the standby Hadoop cluster. For example, the standby Hadoop cluster may obtain the data of the data block based on the mapping table, and the write the obtained data in the Datanotes of the standby Hadoop cluster.

In some embodiments, a computer readable storage medium storing computer programs may be provided. The computer programs may be configured to implement the data synchronization described in elsewhere in the present disclosure, for example, FIGS. 1-9, and the descriptions thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python, or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather,

What is claimed is:

1. A system for data synchronization implemented on a third service cluster, the third service cluster being operably connected to a first Hadoop service cluster and a second Hadoop service cluster, the system comprising:
   at least one storage device including one or more sets of instructions; and
   at least one processor in communication with the at least one storage device, wherein when executing the one or more sets of instructions, the at least one processor is configured to cause the system to:
      receive, at the third service cluster, a synchronization request from the second Hadoop service cluster periodically;
      parse, at the third service cluster, a standby edit log regarding the second Hadoop service cluster based on the synchronization request;
      obtain, at the third service cluster, a master edit log regarding the first Hadoop service cluster in response to the synchronization request;
      determine, at the third service cluster, an offset between the standby edit log and the master edit log;
      obtain, at the third service cluster, based on the determined offset, an updated data block regarding the first Hadoop service cluster and a mapping table regarding the updated data block; and
      back up, at the third service cluster, data of the updated data block to the second Hadoop service cluster based on the mapping table.

2. The system of claim 1, wherein to obtain, at the third service cluster, based on the determined offset, an updated data block regarding the first Hadoop service cluster and a mapping table regarding the updated data block; and back up, at the third service cluster, data of the updated data block to the second Hadoop service cluster based on the mapping table, the at least one processor is further configured to cause the system to:
   determine, at the third service cluster, whether the offset is greater than or equal to an offset threshold;
   in response to a determination that the offset is less than the offset threshold,
      back up, at the third service cluster, the master edit log to the second Hadoop service cluster;
   in response to a determination that the offset is greater than or equal to the offset threshold,
      back up, at the third service cluster, the master edit log, a master fsimage file, and the mapping table to the second Hadoop service cluster, wherein a data block corresponding to the master edit log is designated as the updated data block; and
      in response to the synchronization request from the second Hadoop service cluster, fetch and back up, at the third service cluster, the updated data block to the second Hadoop service cluster based on the mapping table.

3. The system of claim 1, wherein the synchronization request further includes a start memory address and a data length regarding the updated data block.

4. The system of claim 1, further including the first Hadoop service cluster that is operably connected to the second Hadoop service cluster and the third service cluster, the at least one processor is further configured to cause the system to:
   receive, at the first Hadoop service cluster, file metadata from a client, wherein the file metadata is divided into a filename and the data block;
   store, at the first Hadoop service cluster, the filename and the data block in a Namenode and a Datenode respectively; and
   generate, at the first Hadoop service cluster, the mapping table based on a relation between the filename and the data block;
   wherein the Namenode is configured to generate the master edit log regarding the stored file metadata, and generate the master fsimage file corresponding to the master edit log; and the Datanode is configured to report the updated data block to the Namenode according to a Heartbeat mechanism.

5. The system of claim 4, wherein the at least one processor is further configured to cause the system to:
   periodically send, at the first Hadoop service cluster, the master edit log, the master fsimage file, and the mapping table to the second Hadoop service cluster according to the Heartbeat mechanism.

6. The system of claim 4, wherein the at least one processor is further configured to cause the system to:
   receive, at the first Hadoop service cluster, an operation request regarding a specified data block from the client;
   generate, at the first Hadoop service cluster, a corresponding operating instruction in response to the operation request, the operating instruction for directing the first Hadoop service cluster to write the offset to the master edit log; and
   send, at the first Hadoop service cluster, the operating instruction to the Datanode corresponding to the specified data block.

7. The system of claim 1, further including the second Hadoop service cluster that is operably connected to the first Hadoop service cluster and the third service cluster, the at least one processor is further configured to cause the system to:
   receive, at the second Hadoop service cluster, the master edit log, the master fsimage file, the mapping table from the first Hadoop service cluster periodically;
   generate, at the second Hadoop service cluster, a reference value regarding the offset between the master edit log and the standby edit log of the second Hadoop service cluster; and
   generate, at the second Hadoop service cluster, based on the reference value, the synchronization request, and sending the synchronization request to the first Hadoop service cluster or the third service cluster.

8. A system for data synchronization implemented on a first Hadoop service cluster, the first Hadoop service cluster being operably connected to a second Hadoop service cluster and a third service cluster, the system comprising:
   at least one storage device including one or more sets of instructions; and
   at least one processor in communication with the at least one storage device, wherein when executing the one or more sets of instructions, the at least one processor is configured to cause the system to:
      receive, at the first Hadoop service cluster, file metadata from a client, wherein the file metadata is divided into a filename and a data block;
      store, at the first Hadoop service cluster, the filename and the data block in a Namenode and a Datenode, respectively; and generate, at the first Hadoop service cluster, a mapping table based on a relation between the filename and the data block;

wherein the Namenode is configured to generate a master edit log regarding the stored file metadata, and generate a master fsimage file corresponding to the master edit log; and the Datanode is configured to report an updated data block to the Namenode according to a Heartbeat mechanism.

9. The system of claim 8, wherein the at least one processor is further configured to cause the system to:

receive, at the first Hadoop service cluster, an operation request regarding a specified data block from the client;

generate, at the first Hadoop service cluster, a corresponding operating instruction in response to the operation request, the operating instruction for directing the first Hadoop service cluster to write an offset to the master edit log; and send, at the first Hadoop service cluster, the operating instruction to the Datanode corresponding to the specified data block.

10. The system of claim 8, wherein the at least one processor is further configured to cause the system to:

periodically send, at the first Hadoop service cluster, the master edit log, the master fsimage file, and the mapping table to the second Hadoop service cluster according to the Heartbeat mechanism.

11. The system of claim 8, further including the third service cluster that is operably connected to the first Hadoop service cluster and the second Hadoop service cluster, the at least one processor is further configured to cause the system to:

receive, at the third service cluster, a synchronization request from the second Hadoop service cluster periodically;

parse, at the third service cluster, a standby edit log regarding the second Hadoop service cluster based on the synchronization request;

obtain, at the third service cluster, the master edit log regarding the first Hadoop service cluster in response to the synchronization request;

determine, at the third service cluster, the offset between the standby edit log and the master edit log;

obtain, at the third service cluster, based on the determined offset, the updated data block regarding the first Hadoop service cluster and the mapping table regarding the updated data block; and back up, at the third service cluster, data of the updated data block to the second Hadoop service cluster based on the mapping table.

12. The system of claim 11, wherein to obtain, at the third service cluster, based on the determined offset, the updated data block regarding the first Hadoop service cluster and a mapping table regarding the updated data block; and back up, at the third service cluster, data of the updated data block to the second Hadoop service cluster based on the mapping table, the at least one processor is further configured to cause the system to:

determine, at the third service cluster, whether the offset is greater than or equal to an offset threshold;

in response to a determination that the offset is less than the offset threshold, back up, at the third service cluster, the master edit log to the second Hadoop service cluster;

in response to a determination that the offset is greater than or equal to the offset threshold, back up, at the third service cluster, the master edit log, the master fsimage file, and the mapping table to the second Hadoop service cluster, wherein the data block corresponding to the master edit log is designated as the updated data block; and in response to the synchronization request from the second Hadoop service cluster, fetch and back up, at the third service cluster, the updated data block to the second Hadoop service cluster based on the mapping table.

13. The system of claim 11, wherein the synchronization request further includes a start memory address and a data length regarding the updated data block.

14. The system of claim 8, further including the second Hadoop service cluster that is operably connected to the first Hadoop service cluster and the third service cluster, the at least one processor is further configured to cause the system to:

receive, at the second Hadoop service cluster, the master edit log, the master fsimage file, the mapping table from the first Hadoop service cluster periodically;

generate, at the second Hadoop service cluster, a reference value regarding the offset between the master edit log and the standby edit log of the second Hadoop service cluster; and generate, at the second Hadoop service cluster, based on the reference value, the synchronization request, and sending the synchronization request to the first Hadoop service cluster or the third service cluster.

15. A system for data synchronization implemented on a second Hadoop service cluster, the second Hadoop service cluster being operably connected to a first Hadoop service cluster and a third service cluster, the system comprising:

at least one storage device including one or more sets of instructions; and at least one processor in communication with the at least one storage device, wherein when executing the one or more sets of instructions, the at least one processor is configured to cause the system to:

receive, at the second Hadoop service cluster, a master edit log, a master fsimage file, a mapping table from the first Hadoop service cluster periodically;

generate, at the second Hadoop service cluster, a reference value regarding an offset between the master edit log and a standby edit log of the second Hadoop service cluster; and generate, at the second Hadoop service cluster, based on the reference value, a synchronization request, and sending the synchronization request to the first Hadoop service cluster or the third service cluster.

16. The system of claim 15, further including the third service cluster that is operably connected to the first Hadoop service cluster and the second Hadoop service cluster, the at least one processor is further configured to cause the system to:

receive, at the third service cluster, the synchronization request from the second Hadoop service cluster periodically;

parse, at the third service cluster, the standby edit log regarding the second Hadoop service cluster based on the synchronization request;

obtain, at the third service cluster, the master edit log regarding the first Hadoop service cluster in response to the synchronization request;

determine, at the third service cluster, the offset between the standby edit log and the master edit log;

obtain, at the third service cluster, based on the determined offset, an updated data block regarding the first Hadoop service cluster and the mapping table regarding the updated data block; and back up, at the third service cluster, data of the updated data block to the second Hadoop service cluster based on the mapping table.

17. The system of claim 16, wherein to obtain, at the third service cluster, based on the determined offset, an updated data block regarding the first Hadoop service cluster and the mapping table regarding the updated data block; and back up, at the third service cluster, data of the updated data block to the second Hadoop service cluster based on the mapping table, the at least one processor is further configured to cause the system to:

determine, at the third service cluster, whether the offset is greater than or equal to an offset threshold;

in response to a determination that the offset is less than the offset threshold,
back up, at the third service cluster, the master edit log to the second Hadoop service cluster;

in response to a determination that the offset is greater than or equal to the offset threshold,
back up, at the third service cluster, the master edit log, the master fsimage file, and the mapping table to the second Hadoop service cluster, wherein a data block corresponding to the master edit log is designated as the updated data block; and
in response to the synchronization request from the second Hadoop service cluster, fetch and back up, at the third service cluster, the updated data block to the second Hadoop service cluster based on the mapping table.

18. The system of claim 16, wherein the synchronization request further includes a start memory address and a data length regarding the updated data block.

19. The system of claim 15, further including the first Hadoop service cluster that is operably connected to the second Hadoop service cluster and the third service cluster, the at least one processor is further configured to cause the system to:

receive, at the first Hadoop service cluster, file metadata from a client, wherein the file metadata is divided into a filename and the data block;

store, at the first Hadoop service cluster, the filename and the data block in a Namenode and a Datenode, respectively; and generate, at the first Hadoop service cluster, the mapping table based on a relation between the filename and the data block;

wherein the Namenode is configured to generate the master edit log regarding the stored file metadata, and generate the master fsimage file corresponding to the master edit log; and the Datanode is configured to report the updated data block to the Namenode according to a Heartbeat mechanism.

20. The system of claim 19, wherein the at least one processor is further configured to cause the system to:

receive, at the first Hadoop service cluster, an operation request regarding a specified data block from the client;

generate, at the first Hadoop service cluster, a corresponding operating instruction in response to the operation request, the operating instruction for directing the first Hadoop service cluster to write the offset to the master edit log; and send, at the first Hadoop service cluster, the operating instruction to the Datanode corresponding to the specified data block.

* * * * *